Nov. 25, 1969  H. F. HANSCOM  3,480,219
MACHINE FOR WINDING CORD-LIKE MEMBERS INTO HANK FORM
Filed Sept. 5, 1967  3 Sheets-Sheet 1

INVENTOR.
HARRIS F. HANSCOM
BY

*Barlow & Barlow*
ATTORNEYS

INVENTOR.
HARRIS F. HANSCOM

United States Patent Office 3,480,219
Patented Nov. 25, 1969

3,480,219
MACHINE FOR WINDING CORD-LIKE MEMBERS INTO HANK FORM
Harris F. Hanscom, Barrington, R.I., assignor to H. F. Hanscom & Company, Inc., a corporation of Rhode Island
Filed Sept. 5, 1967, Ser. No. 665,389
Int. Cl. B65h 54/56
U.S. Cl. 242—53                              7 Claims

ABSTRACT OF THE DISCLOSURE

A machine having a turntable with at least a pair of winding fingers which will wind, into a hank or other shape, cord-like material of predetermined length.

Background of the invention

There are many items of commerce which are sold in what is known as hanked form; for example, clothesline is sold in hanked form and electrical cord sets are sold in hanked form or are fornished on the electrical appliance in hanked form. In the past it has been quite usual to wind the cord-like material into a hank and then take this same material and wind it about the hank to keep the hank in position, an end being suitably knotted or tied in a fashion whereby the cord-like material will retain the hank-like positioning. This, as might be imagined, is a laborious and time consuming project when a multiplicity of items are being produced in a factory for it not only requires winding in one plane but in effect grasping the hanked portion and winding in a different direction to make a bundle. In many cases part of the winding is done by hand and only a portion is completed by machine. It is desirable to speed up the production of hanked articles and to have a winding machine that will automatically hank a predetermined length of cord and insure a predertermined length of free end.

Summary

A device for hanking a cord-like member that comprises a winding turntable means that is adapted to grasp the end of a cord-like member and put it into hank-like form and is controlled to slow down and stop at a fixed position after a predetermined number of revolutions. The mechanism also includes a traverse guide that, after winding, returns to a datum position regardless of the number of turns wound.

Description of the preferred embodiment

Figure 5:
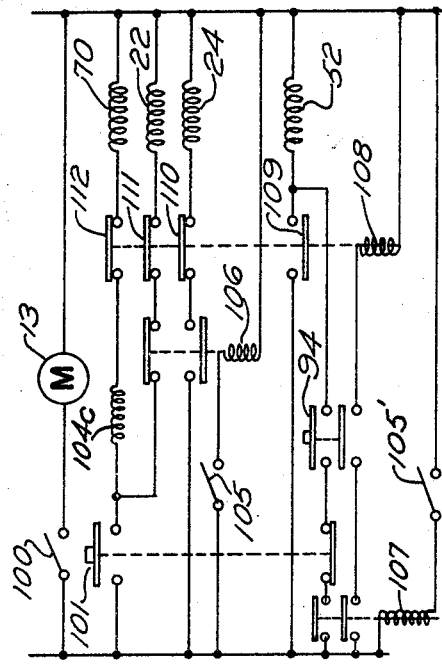
FIG. 5 is an electrical schematic of the electric control.

The machine of this invention may be conveniently mounted on a platform 10 which desirably has sufficient rigidity so that the operating mechanism may be adequately supported. Superimposed on the platform 10 and in spaced relationship thereto is a second platform 12 which is rigidly affixed to the platform 10 so as to effectively provide one integral framework and mounting for additional devices. A main drive motor 13 is mounted on the platform 12 and is designed to rotate continuously while the machine's operation is desired. Two distinct rotative outputs are taken from the motor 13. A first power output is taken by a belt 18 and this output is connected via a sheave such as 19 to a shaft section 20 which is rotationally supported about a shaft 21 and which section extends between a rotative clutch 22 and the sheave 19. A second power output is taken from the motor as by a belt 28 which is in speed reducing arrangement with a shaft section 30 through a train consisting of a large sheave 31 received on one end of a shaft 32 which shaft is generally mounted in a bearing 33 and which shaft has on the other end thereof a smaller sheave 34 that in turn is coupled by a belt 35 to a sheave 36 that is fixed to the shaft section 30. The shaft section 30 is journaled about shaft 21 and extends to one side of the clutch unit 24. The main shaft 21 is supported by pillow blocks 23, 38 and through a brake 52 to the turntable drive.

Figure 1:
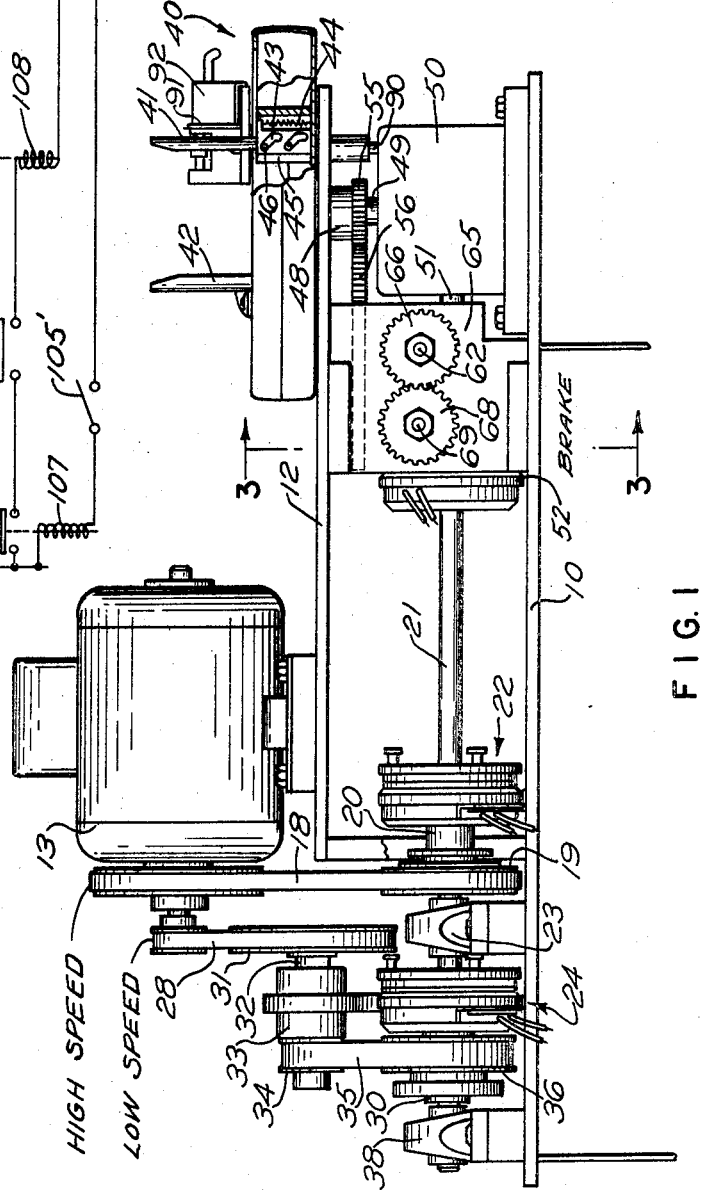
FIG. 1 is a side elevational view of the winding mechanism in the at rest position.
Figure 2:
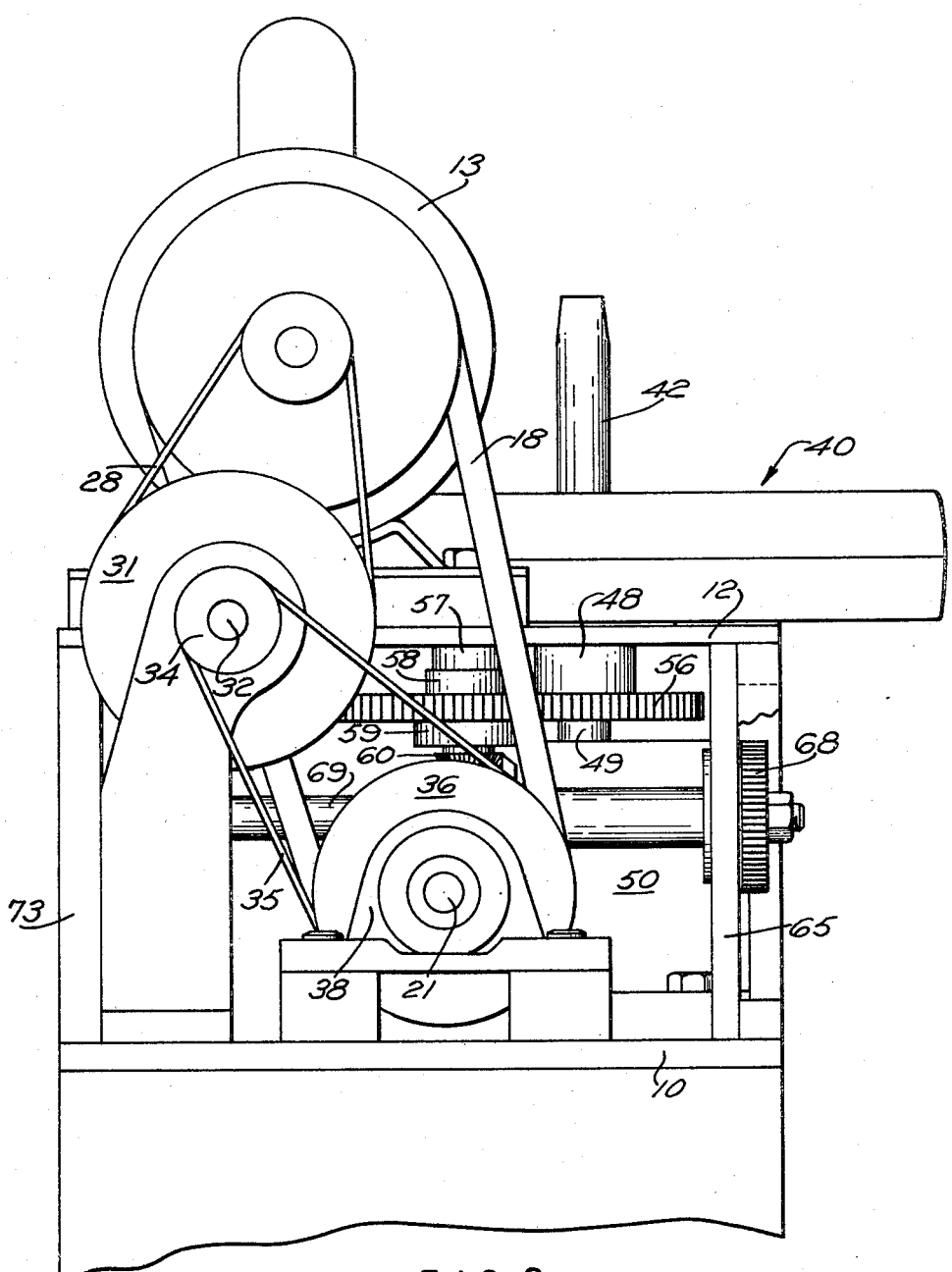
FIG. 2 is an end elevational view showing the drive mechanism for the complete apparatus.

A winding turntable generally designated 40 is provided with a pair of adjustably spaced winding posts 41, 42. These winding posts may be removably fixed in a predetermined relationship relative to the center of the turntable's rotation. For any predetermined length of material and preset number of winding drum revolutions, the spacing of these winding posts will govern the length of the free end of the material being wound. The posts such as 41 (FIG. 1) are provided with spaced slots 43 which receive pins 46 fastened in plates 45, and are normally biased downwardly relative to the plates by a spring 44. If it is desired to move the posts radially inward, this may be done, in which case the posts 41, 42 will be guided radially inward and upward by pins 43 riding in slots 46. The turntable 40 is mounted for rotation in a bearing (not shown) mounted in the platform 12 and is coupled to an output shaft 49 of a right angular drive 50. The right angular drive 50 which is supported on the platform 10 has an input shaft 51 that is coupled to the main drive shaft 21 by a usual shaft coupling which is hidden from view in the drawings. Carried on the main drive shaft 21 is an electromatic braking device 52 which stops the rotation of the shaft 21 and therefore the winding turntable 40 and maintains it in a fixed non-rotative position.

Figure 3:
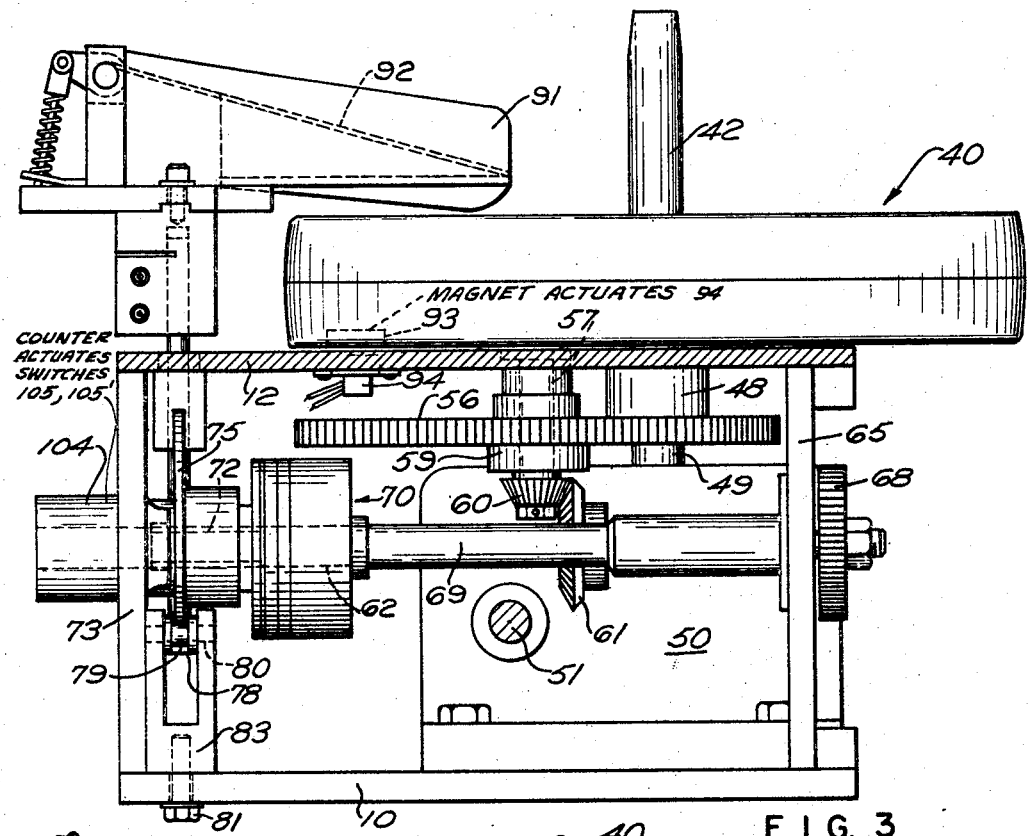
FIG. 3 is an enlarged sectional view taken substantially on lines 3—3 of FIG. 1 of the turntable drive mechanism illustrating the indexing and traversing mechanism for the winding turntable.
Figure 4:
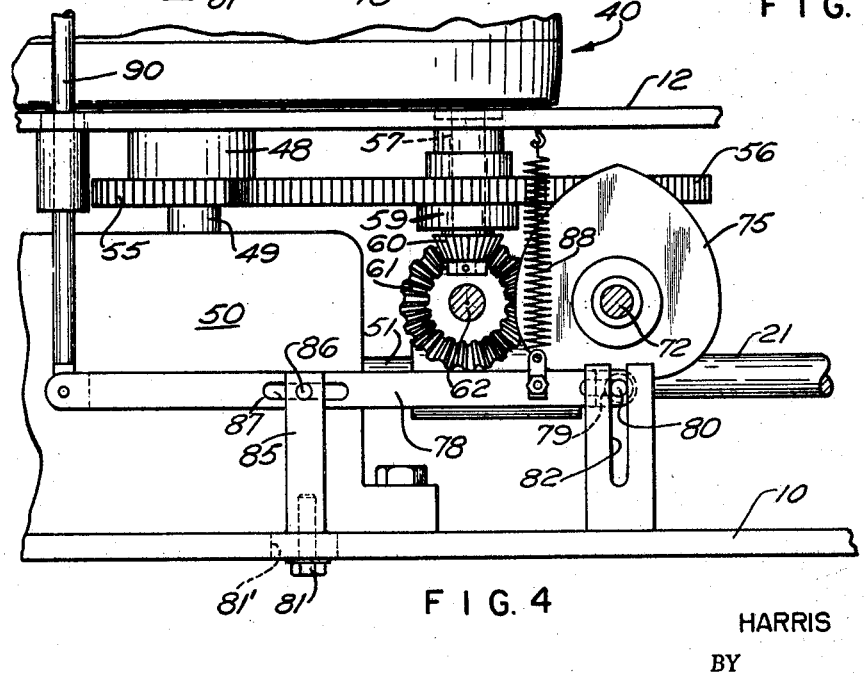
FIG. 4 is an end view taken from the lefthand side of FIG. 3 illustrating more of the traversing mechanism.

On the output shaft 49 of the right angle drive 50 is a spur gear 55 secured to the hub 48 of the winding turntable 40 which engages another spur gear 56 that is rotatably mounted on a fixed stud 57 (FIG. 4) secured to platform 12. On the hub 59 of the spur gear 56 there is secured a bevel gear 60 which engages another bevel gear 61 secured on a shaft 62. The shaft 62 is journally received in a mounting plate 65 (FIG. 1) which carries on the end thereof a changeable spur gear 66. The spur gear 66 engages another changeable spur gear 68 that in turn is mounted on a shaft 69 that is journally received in the mounting plate 65 and thence to a clutch member 70 (FIG. 3). The clutch member 70 has an output shaft 72 generally received in a mounting plate 73, and the shaft 72 carries a heart-shaped cam 75 which actuates a traverse mechanism for winding cord-like material on the posts 41, 42 as will now be described.

A lever 78 (FIG. 4) carries a cam follower 79 in a slot at its free end which cam follower has a pair of trunnions 80 that are received in slots 82 of a bifurcated post 83. The lever 78 is pivoted to a supporting post 85 adjustably secured by a bolt 81 in slot 81' in platform 10 that has a pin 86 received in slot 87 of lever 78. Post 85 is adjustable to allow changes in amplification of traverse. The lever 78 is biased in an upward direction as viewed in the drawings by a spring 88 that maintains the follower 79 against the heart-shaped cam 75. Extending upwardly from the lever 78 is a post 90 that passes through the platform 12 and terminates in a traverse guide channel 91 having a spring loaded cover 92 which may receive cord-like material and which will reciprocate with the motion of the lever 78 as it is pivoted by rotation of the cam 75.

Located in the turntable 40 on the underside thereof, as seen in FIG. 3, is a magnetic bar 93 and secured to the platform 12 is a switch 94 which is sensitive to the presence of the magnet 93. This is used for achieving a certain position stopping of the turntable 40 and reference should now be made to the schematic electrical circuit (FIG. 5) for description of the operation of the winding mechanism as far as it has been described. The electric schematic is shown in standard notation form with the devices illustrated for convenience between a pair of power lines which may be any form of suitable electric current source. A main power switch 100 controls the application of power to the motor 13. This will then apply rotative motion to the shaft sections 20 and 30 both of which are free to rotate about the main power shaft 21 since they are not coupled thereto through any clutch means. We shall assume at this point that the cord-like material that is desired to be wound on the turntable 40 is suitably clamped in position adjacent the post 41. The operator may then depress the start switch 101 which must remain engaged during the complete wind operation. Depressing the switch 101 accomplishes various functions as follows. First, it applies power to the clutch 70, high speed clutch 22, and an internal clutch 104c in the mechanical connection to counter 104, while disengaging the power from the main shaft brake 52. This will now cause rotation of the main shaft 21 in a high speed wind condition and will also operate the traverse mechanism reciprocating the post 90. The number of winds up and down may be chosen by proper selection of the ratio of the spur gears 66 and 68. Since it is normally desired that predetermined lengths of cord-like material will be wound, an adjustable rotational counter 104 (FIG. 3) is coupled to the shaft 62 and after a predetermined number of revolutions of the turntable 40 have been achieved, the rotational counter will actuate internal switches 105, 105' which operate relays 106, 107 disengaging the high speed wind clutch 22, engaging the low speed wind clutch 24 and energizing the leads to switch 94. The shaft section 30 has been rotating at a very slow speed compared to the rotation of the shaft section 20 and the sudden change-over from one clutch engagement to another speed clutch engagement will cause the clutch 24 to effectively act as a brake and slows the turntable down, absorbing all of the rotative momentum in less than one revolution of the turntable 40. As the magnet 93 reaches switch 94, the switch 94 will close, and the following sequence of events will occur: Power will be applied to the brake 52 stopping rotation of the main drive shaft 21. Simultaneously power is applied to a relay coil 108 that closes contactor 109, thus holding in the brake 52, and opens contactors 110, 111 and 112 which remove all power from clutches 24, 22 and 70 and the internal clutch 104c permitting the counter to mechanically reset to datum. Thus, regardless of the position of the start switch 101, the winding operation will have been completed. Upon the disengagement of the clutch 70, the traverse guide means 92 will return to datum by virtue of the heart-shape cam 75. It will be recalled that power has now been removed from the shaft 72. Shaft 72 is free to move and the force exerted by the spring 88 is sufficient to rotate shaft 72 so that the follower 79 will engage in the recess in the heart-shape cam 75, thus returning the traverse guide 92 to its datum position at all times.

I claim:

1. A device for winding cord-like members comprising a turntable having a pair of winding fingers mounted vertically thereon, means for rotating said turntable, adjustable revolution counter means coupled with said turntable and having output means operable upon the completion of a predetermined number of revolutions, a brake coupled to said turntable, a motor, said motor having a high speed output and a low speed output therefrom, said outputs coupled to said turntable rotating means, said couplings including clutch means, means initially engaging the high speed clutch, the output means from said revolution counter simultaneously disengaging said high speed clutch and engaging said low speed clutch, and means responsive to the angular position of said turntable to disengage said low speed clutch and engage said brake, whereby said turntable will always stop in the same position.

2. A device as in claim 1 wherein the spacing of the winding fingers is radially adjustable to permit variation in the length of the free end of the cord-like member left unwound.

3. A device as in claim 1 wherein said clutches and brake are electrically controlled, the output means of the revolution counter is a normally open switch and including a source of electric power, a transfer relay having contacts in circuit with said clutches, and an operating coil in circuit with the revolution counter switch.

4. A device as in claim 1 including a heart-shaped cam, a cam drive clutch, said heart-shaped cam coupled to said turntable through said clutch, a lever having a cam follower, said cam follower engaging the heart-shaped cam and having coupled thereto the traverse guide means, means biasing the cam follower against said heart-shaped cam, said cam follower normally engaging the depression in said heart-shaped cam and returning thereto after declutching from said turntable, whereby said traverse guide channel will always return to a start position.

5. A device as in claim 3 wherein the means responsive to the angular position is a switch having normally open contacts in circuit with said brake, a disconnect relay having normally closed contacts in circuit with said clutches and a normally open contact in circuit with said brake, the coil of said relay in circuit with said switch.

6. A device as in claim 4 wherein the cam drive clutch is responsive to engagement of said brake to disengage driving connection.

7. A device as in claim 4 wherein the pivot point of said lever is adjustable to allow for changes in the degree of traverse of the cord-like member.

References Cited

UNITED STATES PATENTS 2,983,984  5/1961  Handzel _____ 242—53 X
3,229,925  1/1966  Ballmer _____ 242—53 X NATHAN L. MINTZ, Primary Examiner